(12) United States Patent
Han

(10) Patent No.: US 8,915,535 B2
(45) Date of Patent: Dec. 23, 2014

(54) FRAME SEALING UNIT FOR VEHICLE

(75) Inventor: Sang Kyoung Han, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 235 days.

(21) Appl. No.: 13/495,398

(22) Filed: Jun. 13, 2012

(65) Prior Publication Data
US 2013/0147128 A1    Jun. 13, 2013

(30) Foreign Application Priority Data
Dec. 7, 2011 (KR) ........................ 10-2011-0130578

(51) Int. Cl.
  B62D 25/04    (2006.01)
  B62D 29/00    (2006.01)

(52) U.S. Cl.
  CPC .................................. B62D 29/002 (2013.01)
  USPC .................................................. 296/187.02

(58) Field of Classification Search
  CPC ...... B29C 44/18; B29C 44/188; B60R 13/08; B62D 25/02; B62D 25/04; B62D 29/002
  USPC ................. 29/530, 897.2; 52/309.4; 277/316; 296/187.02; 428/71
  See application file for complete search history.

(56) References Cited

U.S. PATENT DOCUMENTS

| | | | | |
|---|---|---|---|---|
| 4,810,548 A | * | 3/1989 | Ligon et al. ..................... | 428/71 |
| 5,344,208 A | * | 9/1994 | Bien et al. ................. | 296/187.02 |
| 5,642,914 A | * | 7/1997 | Takabatake .............. | 296/187.02 |
| 5,806,915 A | * | 9/1998 | Takabatake .............. | 296/187.02 |
| 5,904,024 A | * | 5/1999 | Miwa ............................ | 52/309.1 |
| 5,931,474 A | * | 8/1999 | Chang et al. .................. | 277/316 |
| 6,079,180 A | * | 6/2000 | Wycech .................... | 296/187.02 |
| 6,165,588 A | * | 12/2000 | Wycech ........................ | 428/122 |
| 6,186,581 B1 | * | 2/2001 | Onoue ...................... | 296/187.01 |
| 6,305,136 B1 | * | 10/2001 | Hopton et al. ............... | 52/309.7 |
| 6,357,819 B1 | * | 3/2002 | Yoshino .................... | 296/187.02 |
| 6,382,635 B1 | * | 5/2002 | Fitzgerald ..................... | 277/630 |
| 6,494,525 B1 | * | 12/2002 | Blank ....................... | 296/187.02 |
| 6,729,425 B2 | * | 5/2004 | Schneider et al. ........... | 180/68.5 |
| 6,929,312 B2 | * | 8/2005 | Rich et al. ................ | 296/187.02 |
| 7,422,088 B2 | * | 9/2008 | Ito .................................. | 181/198 |

(Continued)

FOREIGN PATENT DOCUMENTS

| | | | | |
|---|---|---|---|---|
| FR | 2684633 A1 | * | 6/1993 | ............. B62D 65/00 |
| JP | 2010-264843 A | | 11/2010 | |

(Continued)

*Primary Examiner* — Glenn Dayoan
*Assistant Examiner* — Paul Chenevert
(74) *Attorney, Agent, or Firm* — Morgan, Lewis & Bockius LLP

(57) ABSTRACT

A frame sealing unit for a vehicle, that is disposed between a front pillar and a side outer panel of a vehicle, may include a main body where a mounting space is formed at one end thereof, a first pad that is inserted into the mounting space, a bonding member that is bonded to one side lower surface of the main body and an insert portion is formed on the exterior circumference thereof, a second pad that is inserted into the insert portion corresponding to the shape of the bonding member, a sub-body that is mounted on the bonding member in a position corresponding to one side surface of the main body and is spaced apart from the main body to form an operating space, and an expandable pad that is inserted into the operating space and slid when heated to an initial temperature.

6 Claims, 6 Drawing Sheets

(56) References Cited

U.S. PATENT DOCUMENTS

| | | | |
|---|---|---|---|
| 7,494,179 B2* | 2/2009 | Deachin et al. | 296/187.02 |
| 7,819,377 B2* | 10/2010 | Kinpara et al. | 249/117 |
| 8,133,420 B2* | 3/2012 | Billotto et al. | 264/55 |
| 8,608,230 B2* | 12/2013 | Young et al. | 296/187.02 |
| 2002/0125739 A1* | 9/2002 | Czaplicki et al. | 296/187 |
| 2007/0018483 A1* | 1/2007 | Kerscher et al. | 296/187.02 |
| 2009/0001758 A1* | 1/2009 | Hanley et al. | 296/187.02 |
| 2009/0096251 A1* | 4/2009 | Niezur et al. | 296/187.02 |
| 2012/0146296 A1* | 6/2012 | Deachin et al. | 277/637 |

FOREIGN PATENT DOCUMENTS

| | | | | |
|---|---|---|---|---|
| JP | 4729027 B2 | 4/2011 | | |
| KR | 10-0412861 B1 | 12/2003 | | |
| WO | WO 2008116512 A1 * | 10/2008 | | B60R 13/08 |

* cited by examiner

FRAME SEALING UNIT FOR VEHICLE

CROSS-REFERENCE TO RELATED APPLICATION

The present application claims priority of Korean Patent Application Number 10-2011-0130578 filed Dec. 7, 2011, the entire contents of which application is incorporated herein for all purposes by this reference.

BACKGROUND OF INVENTION

1. Field of Invention

The present invention relates to a frame sealing unit for a vehicle. More particularly, the present invention relates to a frame sealing unit for a vehicle that improves workability and sealing performance of a vehicle by mounting a foamed material whose shape can be varied between a front pillar and a side outer panel of a vehicle.

2. Description of Related Art

Generally, a foamed pad is disposed between a front pillar and a side outer panel of a vehicle to improve NVH (noise, vibration, and harshness), waterproofing, and rust proofing performance.

The foamed pad is assembled to a front pillar, and is then mounted on a side outer panel.

The size of the foamed pad is to be minimized to prevent interference with the side outer panel when it is mounted on a vehicle body.

However, a conventional foamed pad forms a gap between a front pillar and a side outer panel, and therefore there is a problem that moisture permeates and rust proofing performance is deteriorated.

Also, assembly interference occurs when it is assembled on a vehicle body, and there is a problem that workability is deteriorated in a painting process.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a frame sealing unit for a vehicle having advantages of improving workability, waterproofing, and rust proofing performance in an assembly or a coating process of a vehicle by mounting a foamed material of which volume is varied depending on the temperature between a front pillar and a side outer panel of a vehicle.

Various aspects of the present invention provide for a frame sealing unit for a vehicle that is disposed between a front pillar and a side outer panel of a vehicle that may include a main body where a mounting space is formed at one end thereof, a first pad that is inserted into the mounting space, a bonding member that is bonded to one side lower surface of the main body and an insert portion is formed on the exterior circumference thereof, a second pad that is inserted into the insert portion corresponding to the shape of the bonding member, a sub-body that is mounted on the bonding member in a position corresponding to one side surface of the main body and is spaced apart from the main body to form an operating space, and an operating means that is inserted into the operating space and slidably moves depending on a temperature variation.

The operating means may includes an operating plate where a mounting portion is formed at an upper end portion and first and second supporting portions are sequentially formed at a lower end portion, a third pad that is inserted between the first and second supporting portions and is varied depending on a temperature increase to slidably move the operating plate, and a fourth pad that is inserted into the mounting portion.

The main body may include a plurality of guide portions that are formed at one side upper portion and are connected to the first and second supporting portions, an insert portion that is integrally formed to bend at one end surface of the respective guide portions, and a hook portion that is formed in a length direction at a lower end portion of the guide portion.

A stopper may be formed at one side surface of the first and second supporting portions to prevent the operating plate from being separated from the guide portion in a condition that the operating plate is inserted in the guide portion.

The frame sealing unit for a vehicle may include a support portion that is supported by the hook portion that is formed at one side upper portion of the bonding material.

A plurality of connection portions may be formed at one side surface of the sub-body, and the connection portion is inserted into the insert portion.

A plurality of protrusions may be formed at one side surface of the sub-body, and the protrusion can be inserted into the front pillar.

Various aspects of the present invention provide for a frame sealing unit for a vehicle that may have a foamed material whose volume is varied depending on temperature to improve workability, waterproofing, and rust proofing performance in an assembly or a coating process of a vehicle between the front pillar and the side outer panel of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
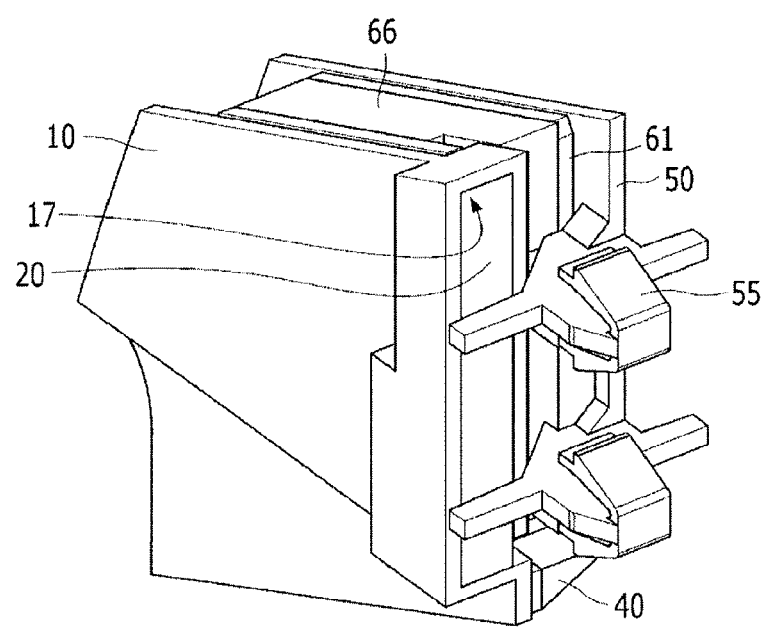
FIG. 1 is a perspective view of an exemplary frame sealing unit for a vehicle according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In order to clarify the present invention, parts that are not connected with the description will be omitted, and the same elements or equivalents are referred to by the same reference numerals throughout the specification.

Also, the size and thickness of each element are arbitrarily shown in the drawings and the present invention is not necessarily limited thereto, and in the drawings, the thickness of layers, films, panels, regions, etc., are exaggerated for clarity.

Figure 2A:
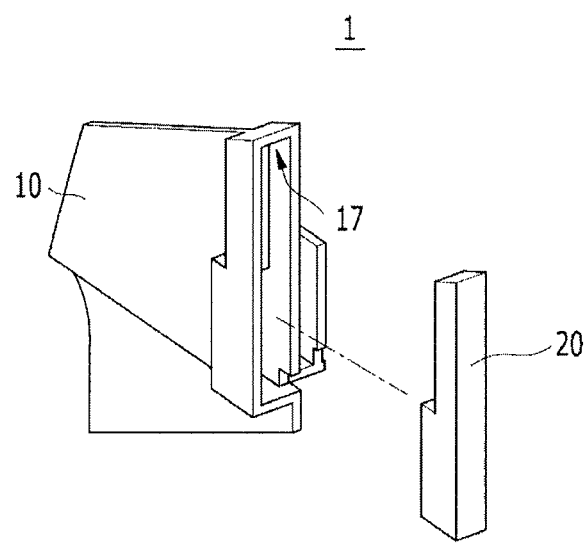
FIGS. 2A and 2B are drawings showing an exemplary mounting order of a frame sealing unit for a vehicle according to the present invention.
Figure 2B:
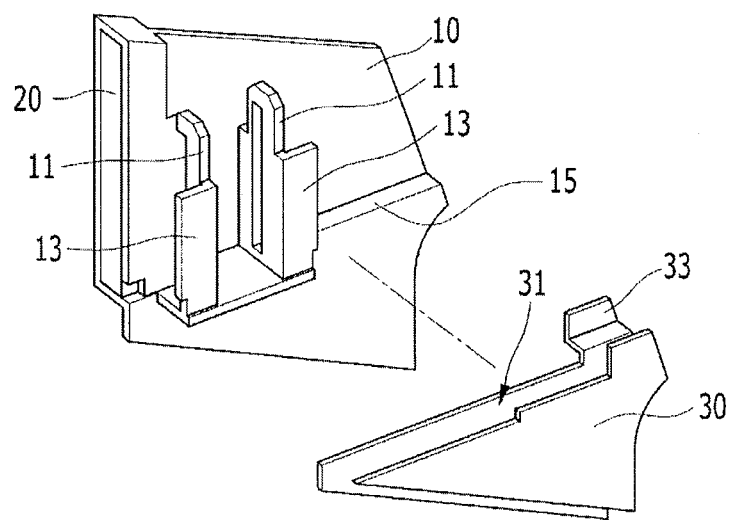
Figure 3A:
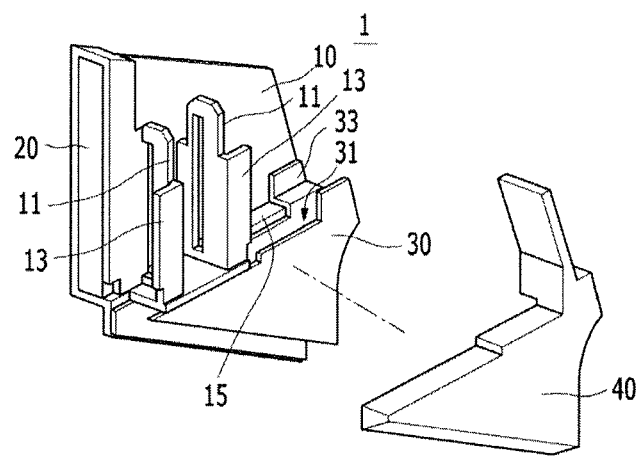
FIGS. 3A and 3B are drawings showing an exemplary mounting order of a frame sealing unit for a vehicle according to the present invention.
Figure 3B:
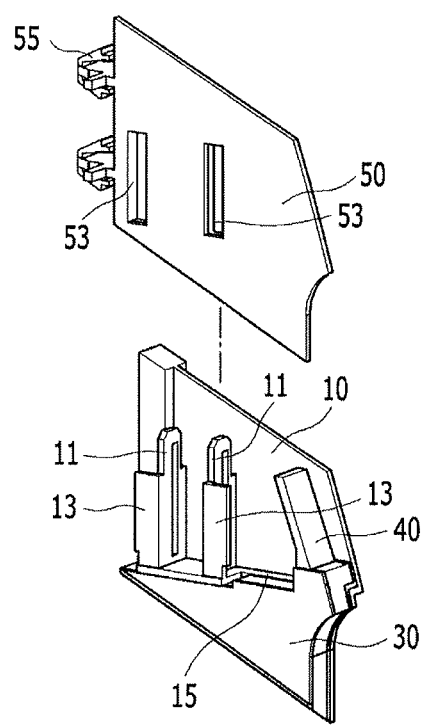
Figure 4A:
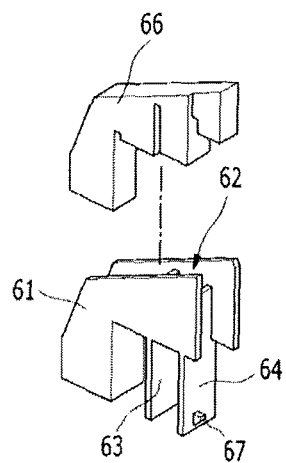
FIGS. 4A, 4B and 4C are drawings showing an exemplary mounting order of a frame sealing unit for a vehicle according to the present invention.
Figure 4B:
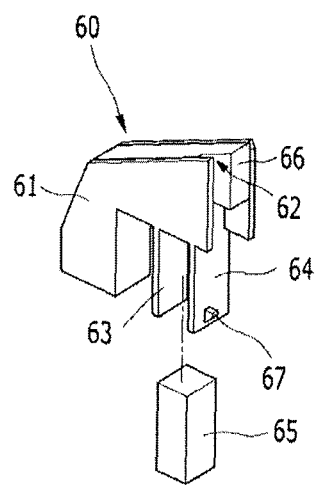
Figure 4C:
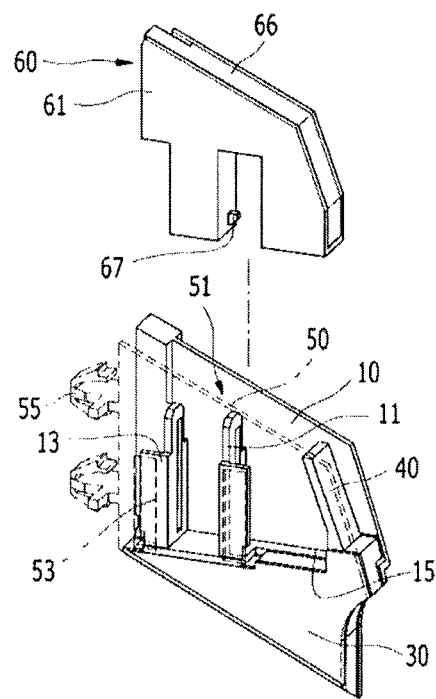
Figure 5A:
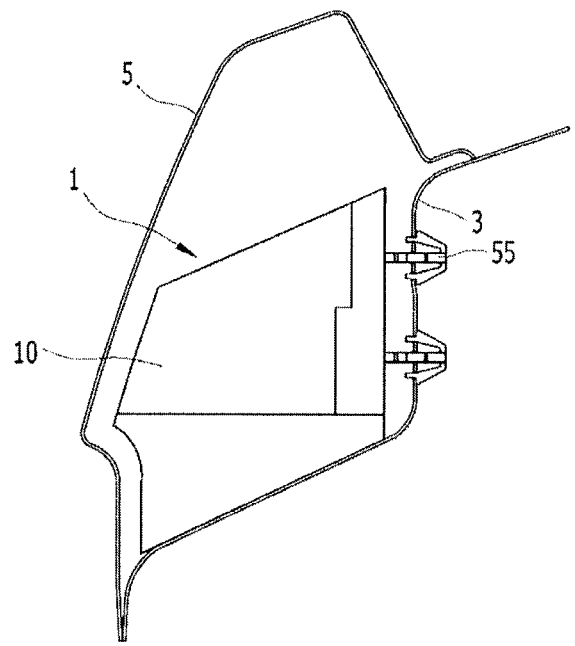
FIGS. 5A and 5B are drawings showing an exemplary operational state of a frame sealing unit for a vehicle according to the present invention.
Figure 5B:
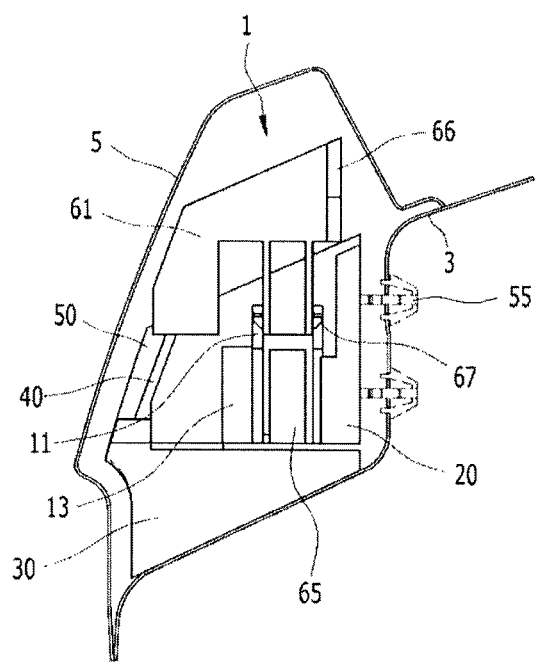

FIG. 1 is a perspective view of a frame sealing unit for a vehicle according to an exemplary embodiment of the present invention, FIGS. 2A-2B are drawings showing a mounting order of a frame sealing unit for a vehicle according to an exemplary embodiment of the present invention, FIGS. 3A-3B are drawings showing an exemplary mounting order of a frame sealing unit for a vehicle according to an exemplary embodiment of the present invention, FIGS 4A-4C are drawings showing a mounting order of a frame sealing unit for a vehicle according to an exemplary embodiment of the present invention, and FIGS. 5A-5B are drawings showing an operational state of a frame sealing unit for a vehicle according to an exemplary embodiment of the present invention.

Referring to FIGS. 1 to FIG. 5B, a frame sealing unit 1 for a vehicle 1 according to an exemplary embodiment of the present invention includes a foamed material that is slidably mounted between a front pillar 3 and a side outer panel 5 of a vehicle, wherein the shape of the foamed material is varied depending on temperature such that workability, waterproofing, and rust proofing performances are improved in an assembly or a painting process of a vehicle.

For this, a frame sealing unit 1 for a vehicle according to an exemplary embodiment of the present invention includes a main body 10, a first pad 20, a bonding material 30, a second pad 40, a sub-body 50, and an operating means 60, and these are explained as follows.

The main body 10 has a mounting space 17 that is formed at one side end thereof.

Here, a plurality of guide portions 11 are formed at one side upper portion of the main body 10, an insert portion 13 is formed at one end portion of the respective guide portion 11 and is integrally bent from the guide portion 11, and a hook portion 15 is formed at a lower end portion of the guide portion 11 in a length direction thereof. One will appreciate that guide portions and insert portions may be monolithically formed.

The first pad 20 is inserted into the mounting space 17 of the main body 10.

The bonding material 30 is attached to one side lower portion of the main body 10, and an insert portion 31 is formed on an exterior circumference of a support portion 30.

Also, the bonding material 30 includes a support portion 33 that is formed at one side upper portion to be supported by the hook portion 15.

The second pad 40 is inserted into the insert portion 31 corresponding to the shape of the bonding material 30.

The sub-body 50 is attached to the bonding material 30 at a position corresponding to one side surface of the main body 10, and is spaced apart from the main body 10 to form an operating space 51.

Also, a plurality of connecting portions 53 that can be inserted into the respective insert portion 13 are formed at one side surface of the sub-body 50, and a plurality of insertion protrusions 55 that can be inserted into the front pillar 3 are formed at one end surface of the sub-body 50.

The operating means 60 is inserted into the operating space 51 to be slidably moved depending on a temperature variation in an exemplary embodiment of the present invention.

The operating means 60 can include an operating plate 61, a third pad 65, and a fourth pad 66.

A mounting portion 62 is formed at an upper end portion of the operating plate 61, and first and second supporting portions 63 and 64 are sequentially formed at a lower end portion thereof.

Here, a stopper 67 is formed at one side surface of the first and second supporting portions 63 and 64 to prevent the operating plate 61 from being separated from the guide portion 11 in a condition that they are inserted into the guide portion 11.

The third pad 65 is inserted between the first and second supporting portions 63 and 64 and is varied depending on a temperature increase to move the operating plate 61, and the fourth pad 66 is inserted into the mounting portion 62.

Hereinafter, a mounting method of a frame sealing unit for a vehicle according to an exemplary embodiment of the present invention will be explained.

Referring to FIG. 2A to FIG. 5B, in a frame sealing unit 1 for a vehicle according to an exemplary embodiment of the present invention, a first pad 20 is inserted into the mounting space 17 of the main body 10, and the bonding material 30 is attached on one side lower portion of the main body 10.

And, after the second pad 40 is inserted into the insert portion 31 of the attached bonding material 30, the sub-body 50 is attached on the bonding material 30 in a position corresponding to one side surface of the main body 10.

That is, the sub-body 50 is attached on one side of the main body 10 through the bonding material 30, and an operating space 51 is formed between the main body 10 and the sub-body 50.

Then, the fourth pad 66 is mounted on the mounting portion 62 of the operating plate 61, and the third pad 65 is inserted between the first and second supporting portions 63 and 64.

Thus, the operating means 60 that is assembled is inserted into the operating space 51 to complete a frame sealing unit 1 for a vehicle according to an exemplary embodiment of the present invention.

Accordingly, the frame sealing unit 1 for a vehicle according to an exemplary embodiment of the present invention is mounted between the front pillar 3 and the side outer panel 5 of the vehicle, and if the temperature is raised in a painting process, the volume of the third pad 65 that is inserted between the first and second supporting portions 63 and 64 of the operating plate 61 is expanded to lift the operating plate 61 in an upper direction such that the space between the panel of the vehicle body and the foamed component is reduced to improve the sealing capacity of the vehicle body. The first, second, third and fourth pads will each expand volumes at different temperatures, for example the third pad 65 will expand first (at a lower temperature) to slide the operating plate (61) to its final position before the remaining pads expand (at higher temperatures.

As described above, a frame sealing unit 1 for a vehicle 1 according to an exemplary embodiment of the present invention has a foamed material that is mounted between the front pillar 3 and the side outer panel 5 of the vehicle, and the volume of the foamed material is varied depending on the temperature such that the workability is improved in an assembly or a coating process and waterproofing and rust proofing performance are also improved.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A frame sealing unit for a vehicle that is disposed between a front pillar and a side outer panel of the vehicle, comprising:
   a main body including a mounting space formed at one end thereof;
   a first pad inserted into the mounting space;
   a bonding member bonded to one lower side surface of the main body and an insert portion formed on an exterior circumference of a support portion;
   a second pad inserted into the insert portion corresponding to a shape of the bonding member;
   a sub-body mounted on the bonding member in a position corresponding to one side surface of the main body and spaced apart from the main body to form an operating space; and
   an operating means insert into the operating space and the operating means slidably moving depending on a temperature variation;
   wherein the operating means includes:
     an operating plate where a mounting portion is formed at an upper end portion and first and second supporting portions are sequentially disposed at a lower end portion;
     a third pad inserted between the first and second supporting portions and varied depending on a temperature increase to slidably move the operating plate; and
     a fourth pad inserted into the mounting portion.

2. The frame sealing unit for the vehicle of claim 1, wherein a plurality of connection portions are formed at one side surface of the sub-body, and each of the connection portions is inserted into a corresponding insert portion.

3. The frame sealing unit for the vehicle of claim 1, wherein a plurality of protrusions are formed at one side surface of the sub-body, and the plurality of protrusions can be inserted into the front pillar.

4. The frame sealing unit for the vehicle of claim 1, wherein the main body includes:
   a plurality of guide portions formed at one side upper portion which are connected to the first and second supporting portions;
   an insert portion integrally formed to bend at one end surface of the respective guide portions; and
   a hook portion formed in a length direction at a lower end portion of the guide portion.

5. The frame sealing unit for the vehicle of claim 4, wherein a stopper is formed at one side surface of the first and second supporting portions to prevent the operating plate from being separated from the guide portion in a condition that the operating plate is inserted in the guide portion.

6. The frame sealing unit for the vehicle of claim 4, further comprising:
   the support portion supported by the hook portion formed at one side upper portion of the bonding material.

* * * * *